US005581291A

United States Patent [19]

Nishiguchi et al.

[11] Patent Number: 5,581,291

[45] Date of Patent: Dec. 3, 1996

[54] REAR SIDE EXPOSURE TYPE ELECTROGRAPHIC IMAGE FORMING APPARATUS

[75] Inventors: Yasuo Nishiguchi, Tokyo; Shunji Murano, Hayato-cho; Hisashi Mukataka; Masayuki Tone, both of Tokyo, all of Japan

[73] Assignee: Kyocera Corporation, Kyoto, Japan

[21] Appl. No.: 69,694

[22] Filed: May 28, 1993

Related U.S. Application Data

[63] Continuation of Ser. No. 797,322, Nov. 25, 1991, abandoned.

[30] Foreign Application Priority Data

Nov. 26, 1990 [JP] Japan .................................... 2-324381
Aug. 7, 1991 [JP] Japan .................................... 3-222149

[51] Int. Cl.$^6$ .................................................... G01D 15/14

[52] U.S. Cl. .......................... 347/129; 347/130; 347/138; 347/139; 347/140; 358/300

[58] Field of Search .................................... 346/155, 160, 346/135.1, 136, 138; 355/269, 270; 347/129, 138, 139, 130, 140; 358/296, 300

[56] References Cited

U.S. PATENT DOCUMENTS

| | | | |
|---|---|---|---|
| 3,653,064 | 3/1972 | Inoue et al. | 346/160 X |
| 3,853,397 | 12/1974 | Cantarano | 346/160 |
| 3,914,045 | 10/1975 | Namiki et al. | 355/270 |
| 4,282,295 | 8/1981 | Lee et al. | 346/135.1 X |
| 4,400,079 | 8/1983 | Landa | 355/269 X |
| 4,420,242 | 12/1983 | Yamashita | 355/270 |
| 4,451,546 | 5/1984 | Kawamura et al. | 430/69 |
| 4,547,787 | 10/1985 | Kaneko et al. | 346/160 |
| 4,610,531 | 9/1986 | Hayashi et al. | 355/245 |
| 4,640,601 | 2/1987 | Deguchi et al. | 355/218 |
| 4,649,094 | 3/1987 | Tamura et al. | 430/126 |
| 4,693,951 | 9/1987 | Takasu et al. | 346/160 X |
| 4,706,130 | 11/1987 | Yamakawa | 358/296 |
| 4,757,332 | 7/1988 | Yuasa | 346/160 |
| 4,794,064 | 12/1988 | Yamazaki et al. | 430/58 |
| 4,851,926 | 7/1989 | Ishikawa | 346/160 X |
| 4,882,252 | 11/1989 | Kawamura et al. | 430/58 |
| 4,930,438 | 6/1990 | Demizu et al. | 118/651 |
| 4,931,876 | 6/1990 | Hashizume | 346/160 X |
| 4,977,050 | 12/1990 | Kawamura et al. | 430/57 |
| 4,992,348 | 2/1991 | Hayakawa | 430/57 |
| 5,121,146 | 6/1992 | Smith et al. | 346/160 |
| 5,159,391 | 10/1992 | Koshi et al. | 355/271 |
| 5,256,513 | 10/1993 | Kawamura et al. | 430/106.6 |

FOREIGN PATENT DOCUMENTS

| | | |
|---|---|---|
| 58-098749 | 6/1983 | Japan . |
| 58-153957 | 9/1983 | Japan . |
| 60-34877 | 2/1985 | Japan . |
| 61-123862 | 6/1986 | Japan . |
| 62-280772 | 12/1987 | Japan . |
| 62-280773 | 12/1987 | Japan . |
| 63-142383 | 6/1988 | Japan . |

*Primary Examiner*—Peter S. Wong
*Assistant Examiner*—Randy W. Gibson
*Attorney, Agent, or Firm*—Loeb & Loeb LLP

[57] ABSTRACT

This invention relates to an image forming apparatus based on the electrophotographic process, more particularly to the image forming apparatus having an exposure member inside of a photoreceptor member, which develops upon receiving light exposed with the exposure member. The image forming apparatus features to include the exposure member having a plurality of LED elements arrayed along a main scanning line of the photoreceptor member which is exposed with the LED elements in a time sharing manner by n bits unit, and the photoreceptor means having the photoconductive layer formed of amorphous silicon compounds for receiving the light. The photoreceptor member is electrified through brushing contact of the developer carried by the toner support member, and wherein the exposure portion of the exposure means is located in the developer brushing contact region.

24 Claims, 7 Drawing Sheets

REAR SIDE EXPOSURE TYPE ELECTROGRAPHIC IMAGE FORMING APPARATUS

This is a continuation of application Ser. No. 07/797,322 filed on Nov. 25, 1991, now abandoned.

BACKGROUND OF THE INVENTION

1. Field of the Invention

This invention relates to an image forming apparatus based on the electrophotographic process applicable to printers, facsimiles and copying machines. More particularly, it relates to the image forming apparatus having an exposure means inside of a photoreceptor formed in a drum or endless belt, whereby the photoreceptor is developed as soon as the exposure with the exposure means.

2. Description of the Prior Art

There has been known an electrophotographic apparatus based on an electrophotographic process or the Carlson process to form image of which photoreceptor drum is disposed around a peripheral thereof with various process means for exposure, development, transfer, and cleaning or removing residual toner particles, erasing charge, and electrification.

Because the various process means are independently disposed around the peripheral of the photoreceptor drum, and because a high potential is required for electrification and biasing, the constitution of the apparatus has been rendered sophisticated and large in size.

To dissolve the issues, a prior technique has provided an image forming apparatus disclosed in Japanese Laid Open Provisional Application No. 58-153957 with a technique called as a rear side exposure system hereinafter. The apparatus is formed with a photoreceptor drum comprising transparent support member, laminating a transparent electroconductive layer and a photoconductive layer thereon. The apparatus also is disposed with an exposure means in the photoreceptor drum of which exposure means generates a light beam corresponding to image information. In the apparatus, the output light beams with the exposure means are focused to expose on the photoconductive layer through a convergence lens. Then soon after the exposure or simultaneously thereto, a latent image is developed into a toner image on the photoreceptor drum which is opposed with the toner support member. Finally, the toner image is transferred on recording paper with a transfer means of transfer rollers, or the like.

In the apparatus of this kind unlike to the traditional Carlson system electrophotographic apparatus of which exposure means is disposed outside of the photoreceptor drum, it is hard to adopt an exposure means which dissipates the light beams with polygon mirror or the like, because the exposure means is disposed inside of the limited space of photoreceptor drum. To dissolve the issue, another prior technique is disclosed in Japanese Laid Open Provisional Application No. 63-142383, in which an apparatus is equipped with an exposure means disposed with a plurality of LED elements in an array along the drum axially thereto, wherein the LED elements are controlled selectively to light corresponding to image information. Another prior technique is also disclosed in Japanese Laid Open Provisional Application No. 62-280772, in which an apparatus is equipped with a liquid crystal shutter disposed between a light source and a convergence lens, wherein the exposure image is formed with the liquid crystal shutter which is controlled to open and close. Still another prior technique is disclosed in Japanese Laid Open Provisional Application No. 62-280773, in which an exposure means is formed by EL head laid with electroluminescence elements in an array.

Several issues, however, are involved in the liquid crystal head, which is restricted within a narrow temperature range to work, which requires an additional light source, and which is limited within a slow processing speed, because of a slow response speed thereof, and because of a small contrast between dark and light tone thereof.

The electroluminescence elements also reveal an issue of which luminescent intensity is weaker than that of LED elements, or the like. Unlike the Carlson system, as described earlier, which exposes the light beam directly on the photoconductive layer, the rear side exposure system has to expose the beam through the transparent support member and the transparent conductive layer. In the event of the weaker luminescent intensity, the less photoactivated charge becomes the photoconductive layer, because the beam has to penetrate the barriers of transparent support member and transparent photoconductive layer. Thus the weak luminescent intensity of the elements becomes a fatal issue to form an intensified image.

The LED head, therefore, is advantageously preferred currently to form the intensified image with a moderate image processing speed.

With the LED head, further, during the process for forming a latent image corresponding to image information illuminating output light beams on the photoreceptor drum, it is possible to strengthen the intensity of the light beam with the enhanced image intensity and sharpness keeping the appropriate image processing speed, if the LED head is applied a large drive electric current. Thus, the LED head gives another advantage.

Care must be taken to adopt the LED head, for example, of which basic constitution is formed as to array n pieces of 64 bits LED tips in a line. It is necessary that 40 pieces of LED tips to print on recording paper having an A4 size width with a pixel density 300 dots/inch (dpi), or approximately 12 dots/mm. It has, then, to control a large current for forming image, if the all set of 64×40 pieces of LED elements are attempted to light on simultaneously for the line. The large current which requires a big power unit renders the constitution of apparatus large in size.

It also renders the joule heat increased to light the large number of LED elements simultaneously for the line pixels. The generation of heat results in the wave length and light intensity of the LED elements fluctuated, of which characteristics strongly depend on the temperature.

As described earlier, the LED head is expected to be disposed in the almost enclosed small space of photoreceptor drum. The temperature in the photoreceptor drum is easily raised, if the exposure process is done in such a manner that the heat generating unit is inserted in the small space of drum. The raised temperature results in varying the dark resistivity and the electron velocity in the photoconductive layer, which exerts an undesirable influence on the image quality. If the attempt is further carried to enclose the space for preventing dust from invasion in the drum at the both ends thereof, the rise of temperature is more intensified to stress mischievously the issue.

Further, it is required for more lead wires corresponding to the large number of LED elements to light the large number of LED elements simultaneously for the full pixel line. The large number of wirings requires a larger space for the LED head in the drum, of which space increases the sectional area of the LED head resulting in abandoning the attempt for a drum in a smaller size. More practically, the issues have restricted the size of photoreceptor drum not to be less than 50 mm diameter.

To dissolve the issues, instead of the LED head driven statically for lightening the LED elements simultaneously for the full pixel line, the inventor has developed an LED head driven dynamically for exposing subsequently the full pixel line in block by block of which pixel line is divided into blocks in a tip unit or an appropriate number n of elements. Each of units is driven one after the other in a time sharing manner.

It is sure that a technique for dynamic drive LED head adopted for the Carlson system is disclosed as in Japanese Laid Open Provisional Application No. 60-34877 and so forth. No prior technique, however, is disclosed, nor information is available for the dynamic drive LED head adopted for the rear side exposure system as in the present invention.

The reason for the no prior technique may be lies in how to form the intensified and sharpened image.

Because, as described earlier, the dynamic drive LED head exposes light beam subsequently the blocks in the time sharing manner within a cycle time for the pixel line, the exposure time for each of blocks must be reduced comparing with that of the static drive LED head. In the apparatus, further, charge photoactivated in the photoconductive layer is rendered small, because the light beam is exposed at the rear side of the photoreceptor through the transparent support member and the transparent electroconductive layer. Thus, it has been impossible to form the image with higher intensity and sharpness.

In the traditional apparatus, therefore, it seems to refrain from adopting the dynamic drive LED head for the rear side exposure system, because no exposure light intensity enough to form the clear image has been available.

SUMMARY OF THE INVENTION

Object of the Invention

In considering the issues involved in the prior techniques, it is an object of the present invention to provide an image forming apparatus which is easily achievable of forming a clear image with a higher intensity and sharpness, without a fog or a poor toner density, having a dynamic drive LED head of which photoconductive layer efficiently establishes the light exposure to electrify for forming the image by a rear side exposure system.

It is another object of the present invention to provide an image forming apparatus, having a photoreceptor with an enhanced durability for abrasion and environment, whereby the apparatus is able to withstand preventively for deteriorating the image quality for a long period.

It is still another object of the present invention to provide an image forming apparatus formable easily a clear image, without having the heat generation of LED head increased to render the temperature in drum raised unnecessarily even in setting the image forming speed or the movement speed of photoreceptor faster than a certain speed as required.

It is still another object of the present invention to provide an image forming apparatus, of which LED head is achievable small in the section area, without a power source big in capacity to drive the LED head, without a number of lead wires and drive IC's, resulting in being achievable the photoreceptor small in size without dimensional restriction for the LED head, of which, more practically, photoreceptor is adopted with a diameter less than 50 mm.

Outline of the Invention

The aim of this invention, therefore, lies in to dissolve an issue to form a clear image adopting a dynamic drive LED head as an exposure means for the rear side exposure system within an exposure time of 1/m compared to the traditional static drive LED head, where m is number of blocks. The issue includes a technique to be achieved for receiving efficiently substantially a small exposure energy at the photoreceptor. The issue also includes a technique to be achieved for converting efficiently a latent image generated by the received energy into a visible image without decaying charge on the surface thereof, and without producing fog.

The present invention, therefore, features an apparatus with an LED head of dynamic drive system as an exposure means adopted amorphous silicon compounds (a-Si) for the photoconductive layer on the photoreceptor which receives an output light beam from the LED head.

The photoconductive layer made of the a-Si, unlike such traditional photosensitive materials as SeAs, SeTe, CdS, organic photoconductors (OPC), or the like, has an improved capability for light energy reception and for photoelectronic carrier generation. The generated carrier in the a-Si layer, further, is able to move easily which allows an effective photoelectronic conversion even by a small output light in a quite short time with the dynamic drive system.

It further has to make the electroconductive layer thinner, and has to make the electric field intensity higher to achieve efficiently the photoelectronic conversion even by a small output in a quite short time. With the LED array adopted as the exposure means, it is rather difficult to obtain a preferred exposure charge because a thin photoconductive layer reduces photoreceptivity therein.

The thickness of the hydrogenated amorphous silicon (a-Si:H), however, is about 2.2 μm to absorb a 90% of the incident light for the luminous wave length of 660 nm of the LED element.

Thus, the photoconductive layer formed of a-Si:H with a thin thickness, preferably not less than 2 μm, is achievable to obtain a certain electrostatic potential as desired with an even small output light.

That is, the object of the invention is effected by forming the thin photoconductive layer of a-Si compounds for the photoreceptor which receives the output light from exposure means. The a-Si compounds layer has further effected the object to adopt the LED head driven dynamically for the exposure means.

With the a-Si compounds photoreceptor, the LED elements arrayed in n elements by m blocks (n×m) along the scanning line of the photoreceptor are able, not to light simultaneously, but to light subsequently n bits elements block after another block. Thus, the current for the LED head is reduced to 1/m compared with the traditional static drive system, resulting in the power source small in capacity, and resulting consequently in the peripheral electric units less complicated which forms the apparatus small in size.

Because the dynamic drive system controls subsequently the blocks by switching driver means, the wires enough to connect with the preceding unit are consisted of n numbers of lead wires for receiving the image information, and of a pair of common wires for switching. The small number of the wires also renders an extensive fall of heat generation in the apparatus comparing with the static drive system. The stable circumference can provide a fall of variation of wave length and illumination intensity for each of elements to form a stable latent image.

Because each of blocks of LED head is driven in the time sharing manner, the number of drive IC's equipped therein corresponds to the number of lead wires. Thus, the sectional area of the LED head is reduced in size to fit in a small drum. It becomes, therefore, possible to provide an apparatus with the rear side exposure system of which practical photoreceptor drum with a diameter of about 30 mm.

Thus, the reduction of the overall heat generation of the LED head keeps the temperature unchanged, and exerts no harmful effect on the image quality during which, as described earlier, the head is inserted in the photoreceptor drum having a small diameter of less than 50 mm, or preferably of about 30 mm.

Turning back to the earlier description, the issues on the photoreceptor will be further described in detail. The charge formed by the exposure of light beam stored in the photoconductive layer of photoreceptor has to be kept until it reaches to the locations of development and transference on recording paper. Because the photoconductive layer has the transparent electroconductive layer at the rear side thereof of which latter layer is also capable to act as an electrode, electrons are injected from the electroconductive layer to the photoconductive layer when developing bias is applied positive on a developing sleeve opposite to the electroconductive layer through the photoconductive layer. Positive holes, on the contrary, are injected to the photoconductive layer from the electroconductive layer, if the bias is applied negative on the developing sleeve. The injections render a fall of the electrified potential of exposed image, resulting in sometimes a fall of image intensity and formation of fog.

To dissolve the issues, therefore, it is preferred in the present invention to form an injection blocking layer at the interface between the transparent electroconductive layer and photoconductive layer.

In the constitution above, the photoconductive layer is protected against injections of electrons and of positive holes from the electroconductive layer with the injection blocking layer without the fall of potential. Thus, the image is prevented from the fall of image density, and from the formation of fog during the developing process.

The dark resistivity of the injection blocking layer is not necessarily higher than $10^{14}\Omega\cdot cm$, but is preferred within a range from $10^8$ to $10^{13}\Omega\cdot cm$.

The blocking layer is not necessarily dielectric, because the dark resistivity in the preferred range is enough to block the injection of electrons and positive holes during the movement up to the transference location. If there is a barrier of dielectric layer on the contrary, a residual charge is again brought to the exposure location without decreasing to be eliminated. The residual charge requires another process for erasing thereof by means of erasing illumination, and so forth. If the process failed to erase completely the residual charge, which is apt to do, a residual image is not sometimes able to vanish.

The high resistance layer, therefore, is possible to eliminate the residual charge on the way from transference to exposure location, of which elimination is further assured with a combination of eraser to enhance the image quality.

The injection blocking layer is preferably made of a-Si compounds doped with a high concentration of the III or V group elements and together with oxygen and nitrogen, or of amorphous silicon carbide (a-SiC) with high hardness and chemical stability, whereby the environmental durability and adaptability of the layer are increased, whereby the image quality is prevented from deterioration for a long period. The injection blocking layer further provides with a strong bonding strength between the photoconductive layer and the transparent electroconductive layer.

The image forming apparatus of the rear side exposure system generally is consisted of no independent electric charging unit as prior techniques teach in Japanese Laid Open Provisional Patent Applications 62-280772, 63-142383, and so forth. The apparatus of the prior techniques is comprised of a toner support member (or a developing sleeve) which bears magnetic toner thereon, a magnetic pole disposed stationarily inside the toner support member, a photoreceptor drum disposed oppositely to the toner support member, wherein the magnetic pole makes the toner in a form of brush to form a toner brushing contact region in the space between the toner support member and the photoreceptor drum, and means for biasing the toner support member of which charge is transferred through the toner brushing contact region to the photoconductive layer of the drum to electrify thereof. The toner brush also provides a cleaning effect by the brushing contact on the surface of drum. Thus, the apparatus is constituted without the charging unit nor a cleaning unit, whereby an attempt has been tried to form an apparatus small in size with a few unit, and with a simple constitution.

In the apparatus above, electric conductive toner, or electric conductive toner carrier is adopted to make easier the charge transference through the brushing contact. The exposure charge in the photoconductive layer is apt to be released through the conductive developer, if the conductive developer directly contacts therewith. Because with the small capacity of charge in the thin photoconductive layer as in the present invention, the release of exposure charge particularly affects the image quality.

Thus, in the apparatus adopting the electric conductive toner, or electric conductive toner carrier, the present invention features to form a high resistance layer, or a dielectric layer on the surface of the photoconductive layer to prevent from the charge injection.

Therefore, the formation of the high resistance layer, or the dielectric layer on the surface of photoconductive layer is possible to protect effectively the photoconductive layer from injection of charge from the developing sleeve. Thus, the issue can be dissolved, and the capability of holding the exposure charge can also be improved.

Further, the present invention can improve the light sensitivity and the voltage resisting capability as well of the photoconductive layer because the layer thereof is formed of a layer with an improved rate of photocarrier generation, and of a layer with an improved transport rate of photocarrier laid thereon, formed of a single layer instead.

The second issue of the electrification process through the toner brushing contact is involved in the location of the exposure process after the electrification process within the region of toner brushing contact. If the location of the exposure process is disposed at the region of toner brushing contact, there happens easily to electrify again the layer of drum succeeding to the processes of exposure and developing. Thus, issues of fall of image density, of distortion of the image, and of fog are formed not to improve the image quality.

Therefore, the present invention features to dispose, in the toner brushing contact region, the exposure location from the middle of the region to the downstream along the photoreceptor movement direction.

Thus, the length or time of electrification is made maximum, and the reelectrification time for reaching to the end of the toner brushing contact region is made minimum or null, even if the layer is electrified again after the processes of exposure and developing. The image forming in a high quality, therefore, can be achieved without the fall of image density, distortion of image, nor fog.

The constitution, however, still involves reelectrification at the site of exposure through the conductive toner. The issue can be overcome by the experiment that pulse time for each of blocks driven dynamically is set in a range from 45 to 100 μs, provided however, the photoconductive layer is made of a-Si compounds.

Another issue further has to be considered to transfer the developed toner on paper. The dielectric toner can be transfer red with the use of an electrostatic transfer means by corona discharging, of which means can not apply to the conductive toner. The conductive toner is transferred on recording paper generally with a transferring roller which is enforced to assure the transference by transferring bias, heat, or magnetic force. But the resistivity of paper is easily apt to vary following humidity and other atmospheric factors. Thus, it is impossible to obtain stable transference of toner to form a high quality image.

The present invention, therefore, provides a two-components developer consisting of a carrier particle of which surface, at least, is formed in electric conductive, and a toner particle of high resistive or dielectric material. More preferably as shown in FIG. 7, the electric conductive carrier is formed in a particle dispersed with magnetic powder in binding plastics of which surface is stuck with a number of electric conductive fine particles. The diameter of the carrier is as large in a range from 1 to 5 times as that of the toner.

It is possible, therefore, the stable toner transference with the toner of high resistance or dielectric, while it is possible to set the electric conductivity of carrier high independently to the transference portion because the charge is injected with the electric conductive carrier. Thus, the electrification time is able to be short.

Further, it is possible to stabilize the electrification and developing with the carrier having the electric conductivity independently to the inner composition thereof because the conductive fine particles are attached on the surface thereof. In addition to the above, it is sustainable a strong magnetism on the carrier because magnetic powder is dispersed in the binding material. Thus, the developer brushing contact region or a toner accumulation is preferably formed harmoniously without a hitch.

In the constitution above, it is, as described earlier, necessary to reduce the resistivity of developer in order to reduce the electrification time. With the two-composite developer, it is difficult to lower a composition ratio of dielectric toner to obtain a certain image density. It is, therefore, difficult to lower the resistivity of developer consequent to a rise of composition ratio of the electric conductive carrier.

In the event when the carrier is deteriorated due to exfoliation of the electric conductive fine particles, the carrier becomes dielectric. With the carrier size to be set as large as 1 to 5 times of the toner size, the deteriorated carrier is removed from the brushing contact region by sticking on the portion of latent image of photoreceptor drum together with toner to keep preferably the toner accumulation fresh.

If the deteriorated carrier is set to have the same color as to the toner, and is also made of thermally meltable plastics, the carrier is processed in the same way as to toner having no effect on the image quality.

In order to realize to reduce the resistivity of developer in the electrification region without reducing the toner density at the developing location, the present invention features to set the moving direction of the photoreceptor in brushing contact region and the carrying direction of toner in opposite relation which is called as counter feeding hereinafter. Supposing the apparatus is formed of a photosensitive drum of photoreceptor and a developing sleeve of toner support member, it is possible to set the moving directions of the drum in opposite to that of the developer when each of devices is rotated in the same direction, that is, in a clockwise way or a counterclockwise way.

In the constitution above, the developing process is accomplished without reducing the toner density because the fresh developer with a desired density is introduced firstly to the developing location opposite to the developing sleeve which carries the toner. Then, the toner is attached on the drum remaining the developer rich in the conductive carrier. Because the developer with a less resistivity in brushing contact with the drum in the electrification region, it is possible to electrify smoothly even within a short electrification time.

It is, as described earlier, preferable to adopt a-Si compounds as the photoconductive layer in order to lower the electrostatic capacity of photoreceptor to reduce the electrification time.

To accomplish the object in making the photoreceptor drum small in size, as described earlier, the present invention features to adopt the dynamic drive system for driving the LED head. It is also contributes to make the developing sleeve small in size for miniaturizing the apparatus, together with the photoreceptor.

As shown in FIG. 6, however, if the attempt is tried to reduce the scale each for the photoreceptor drum and the developing sleeve, the smaller each diameter of devices, the more narrower becomes the developer brushing contact region between the drum and the sleeve.

The exposure site is disposed at the downstream along moving direction of photoreceptor from the middle of developer brushing contact region to assure a certain area for the electrification region. But the disposition is not enough to electrify the drum. It is, further, necessary to shorten the electrification time for the photoconductive member from the beginning to the end until it reaches to a certain charge level, assuring the paper feeding speed.

In order to shorten the electrification time, it is enough to reduce the electrostatic capacity of photoreceptor drum.

To accomplish this, the photoconductive layer is formed of a-Si compounds in a thin layer, more practically, having a thickness of from 2 to 17 μm considering a contradiction with photoreceptive efficiency thereof.

In the constitution above, further, the possible minimum distance of brushing contact, in other words, the time for brushing contact sufficient for enabling the electrification and exposure with respect to the moving speed of the photoreceptive member, has to be confirmed.

Providing: C as a electrification time from the beginning of electrification in the brushing contact region to the end until the photoreceptive member reaches a required charge level, R as an exposure time for discharge starting from the required charge level due to the exposure to a charge level for latent image, and T as a passing time in which the photoreceptive member passes across the brushing contact region formed in a space between the photoreceptive member and the toner support member, the preferable image is formed if the conditions are satisfied as shown in FORMULAE as follow, T>C+R FORMULA (1), and

C>R FORMULA (2).

That is, it is impossible to accomplish the electrification and exposure processes, if the passing time T is not greater than the sum of electrification and exposure times. The electrification time C should be greater than the exposure time R, otherwise the member is apt to electrify again soon after the exposure process of which charge decreases the image density, forms fog, and damages the image sharpness.

The exposure site, as described earlier, is preferred to disposed at the downstream along the movement of the photoreceptor member from the middle of brushing contact region. It is more preferable to set the passing time T:

T<2C+R FORMULA (3), to prevent from reelectrification in the developer brushing region soon after the exposure, which results in exfoliation of toner particles from the exposed portion before reaching to the transfer roller. The FORMULA (3) means that the maximum passing time $T_{max}$ should not exceed a sum of times of the charging time C, the exposure time R and the reelectrification time. As the reelectrification time is not more than or the same to the charging time C, the maximum passing time $T_{max}$ should not be greater than (C+R+C), which is expressed as the FORMULA (3).

Further, the fluidity of developer depends on temperature, that is, the higher the temperature, the less the capability of flowing becomes the developer. In the LED head for exposure is in the static drive system with the rear side exposure system, the fluidity falls as a consequence of the rise of temperature, wherein the developer brushing contact region between the drum and sleeve is easy to vary. The present invention because of dynamic drive system provides a little temperature rise which is more advantageous than the traditional ones.

BRIEF DESCRIPTION OF THE DRAWINGS

FIGS. 2 through 4 are views showing an exposure unit relating to an embodiment of the present invention, in which FIG. 2 is an elevation showing a layout constitution of the same, FIG. 3(A) is a perspective view showing a head block, of which LED array of print circuit board is shown in enlarged perspective view of FIG. 3(B), and FIG. 4 is a circuit block diagram showing an LED head of dynamic drive system disposed on the print circuit board.

DETAILED DESCRIPTION OF THE PREFERRED EMBODIMENT

Preferable embodiments of the present invention will be described in detail with reference to the drawings. Unless otherwise specified, however, the dimensions, materials, shapes, relative location, or the like, of the constitutional part of the described embodiments are not intended to limit the scope of the invention, but are described for the purpose of illustration.

Following will describe, firstly, a constitution of main parts for an image forming apparatus relating to the embodiment of the present invention.

Figure 1:
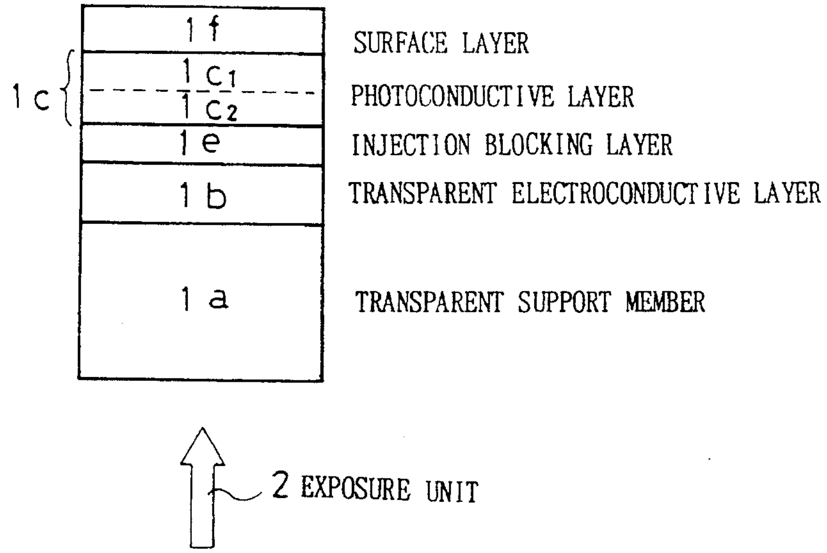
FIG. 1 is an enlarged sectional elevation showing a constitution of photoreceptive member possible to form in either drum or belt relating to an embodiment of the present invention.

FIG. 1 is an enlarged sectional elevation showing a constitution of photoreceptive member 1 possible to form in either drum or belt. The photoreceptive member 1 was formed in a lamination layer on a transparent support member 1*a*, of which photoreceptive member further comprised: a transparent electroconductive layer 1*b*, an injection blocking layer 1*e*, photoconductive layer 1*c*, and surface layer 1*f*.

The constitution of the photoreceptive member 1 will be further described in detail.

The transparent support member 1*a* may be made any of such glass as any of heat-resistance and chemical-resistance glassware available under a trademark of Pyrex, boron silica glass, soda glass, or the like, any of artificial inorganic material such as quartz or sapphire, or any of transparent resins such as fluorine resins, polyesters, polycarbonates, polyethylenes, polyethylene-terephthalates, epoxies, and so forth. The support member 1*a* in the embodiment was formed in a cylindrical transparent glass having dimensions of outer diameter 30 mm, of thickness 2 mm, and of length 300 mm.

The transparent electroconductive layer 1*b* is made any of transparent electroconductive material such as indium-tin-oxide (ITO), lead oxide, indium oxide, copper iodide, or the like, or any of metal foil thin almost transparent such as aluminum, nickel, gold, or the like. The layer 1*b* in the embodiment was formed by an active reactive evaporation (ARE) method on the surface of the transparent support member 1*a* with a thickness of 1000 Å.

In general manner, the a-Si compound photoconductive layer 1*c*, the a-Si compound injection blocking layer 1*e* and the surface layer 1*f* may be formed by any of a glow discharge electrolysis method, a spattering method, an ECR method, or an evaporation method wherein it is preferable to include such dangling bond terminator of hydrogen or halogen elements in a concentration ranging from 5 to 40 atomic wt. % on the formation process.

The photoconductive layer 1*c* was made of photoconductive material a-Si:H, wherein it was preferable to process without doping, or to include any of the V(a) group elements in order to increase the capability of electron movement, in case developing bias was positive; or contrarily, in case developing bias was negative, it was preferable to include any of the III(a) group elements to increase the capability of positive hole movement. To improve such electronic characteristics as dark electroconductivity, photoconductivity, an optical band gap, and so forth, it may be preferable to include such element as carbon, oxygen, nitrogen, or the like, if required.

The photoconductive layer 1*c* further was consisted of a photoactivation layer region 1*c*1 with enhanced capability of photocarrier generation by a light beam from rear side, and a carrier transport layer region 1*c*2 with enhanced capability of carrier movement, of which two layers made possible to improve the photosensibility and voltage-resistance.

The photoconductive member was formed with a glow discharge decomposition apparatus of capacitance coupling type laminating succeedingly the a-SiC injection blocking layer 1*e*, the a-Si photoconductive layer 1*c*, and the a-SiC surface layer 1*f* on the transparent electroconductive layer 1*b*. The resistivity of each of the injection blocking layer 1*e* and the surface layer 1*f* was formed in a range from $10^{12}$ to $10^{13}\Omega\cdot cm$.

The photoactivation layer region 1*c*1 was formed in a slow lamination speed, with a high diluent ratio of hydrogen and helium, and with a higher doping element ratio than that of transport layer region 1*c*2, and so forth, whereby the capability of carrier generation was improved.

The carrier transport layer region 1*c*2 was possible to form in opposite way to the method for the former region 1*c*1. The transport layer region 1*c*2 was effective mainly for raising the voltage-resistance of the photoreceptive member 1, for transporting smoothly the carrier injected from the activation layer region 1*c*1 to the surface of the member 1. The transport layer region 1*c*2 also generated the carrier upon receiving the light beam penetrated through the photoactivation layer region 1*c*1, whereby the layer region 1*c*2 contributed to the photoreceptivity of the photoreceptive member 1 as well.

It was preferable to form the photoactivation layer region 1*c*1 having a thickness in a range from 0.03 to 5 μm, or more preferably in a range from 0.5 to 3 μm. It was also preferable to form the transport layer region having a thickness in a range from 0.05 to 10 μm, or more preferably in a range from 1 to 5 μm.

The overall thickness of the photoconductive layer 1*c* consisting of the layer regions 1*c*1 and 1*c*2 was set preferably in a range from 2 to 17 μm considering to assure a necessary charge and voltage-resistance, an enhanced photoreceptivity, and to suppress the residual potential, and so forth.

It was preferred to make the injection blocking layer 1*e* and the surface layer 1*f* any of such inorganic resistance or dielectric a-Si compounds as a-SiC, a-SiO, a-SiN, a-SiON, a-SiCON, or any of such organic dielectric materials as polyethylene-terephthalates, polyparaxylylene available under a trade mark of parylene, polytetrafluoro-ethylene, polyimides, polyfluoro-ethylene-propylene, and so forth. More preferably, the a-SiC layer of high resistivity represented further the high characteristics of dielectric strength, abrasion resistance, environmental endurance, and so forth. The a-SiC layer also improved adhesive strength interfacing the transparent electroconductive layer 1*b* and the photoconductive layer 1*c*.

A value of × of a-$Si_{1-x}C_x$ compounds was preferable in a range $0.3\leqq x<1.0$, or more preferably a range $0.5\leqq x\leqq 0.95$ which gave resistivities ranging from $10^{12}$ to $10^{13}\Omega\cdot cm$ with high humidity-resistance. A gradient of carbon content was allowed to be distributed in the layer. The contents of nitrogen, oxygen, and germanium together with carbon improved the humidity-resistance.

The injection blocking layer 1*e* was preferred to have a thickness ranging from 0.01 to 5 μm, or more preferably ranging from 0.1 to 3 μm. The thickness of surface layer 1*f* was preferred in a range from 0.05 to 5 μm, or more preferably in a range from 0.1 to 3 μm.

In case of the injection blocking layer made of a-Si compounds, it was preferred to include any of the III(a) group elements with a concentration ranging from 1 to 10,000 ppm, or more preferably ranging from 100 to 5,000 ppm, if the developing bias was positive to prevent from the electron injection from the electroconductive layer 1*b*, or to include any of the V(a) group elements with a concentration less than 5,000 ppm, or more preferably ranging from 300 to 3,000 ppm, if the developing bias was negative to prevent from the positive hole injection from the electroconductive layer 1*b*. It was further preferred to include oxygen and nitrogen in a concentration ranging from 0.01 to 30 atomic wt. % to improve the adhesion strength with the transparent electroconductive layer 1*b*.

The exposure unit 2 inserted in the photoreceptor drum 1 thus formed as above will be described referring FIGS. 2 through 4.

Figure 2:
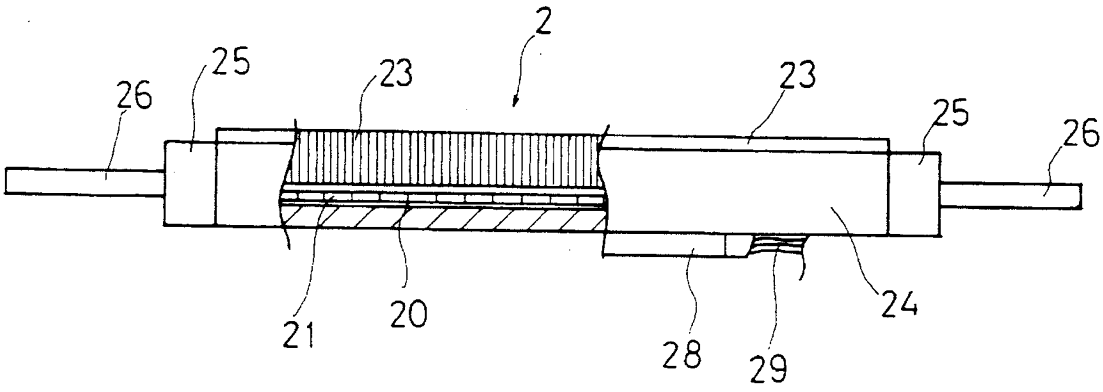
Figure 3:
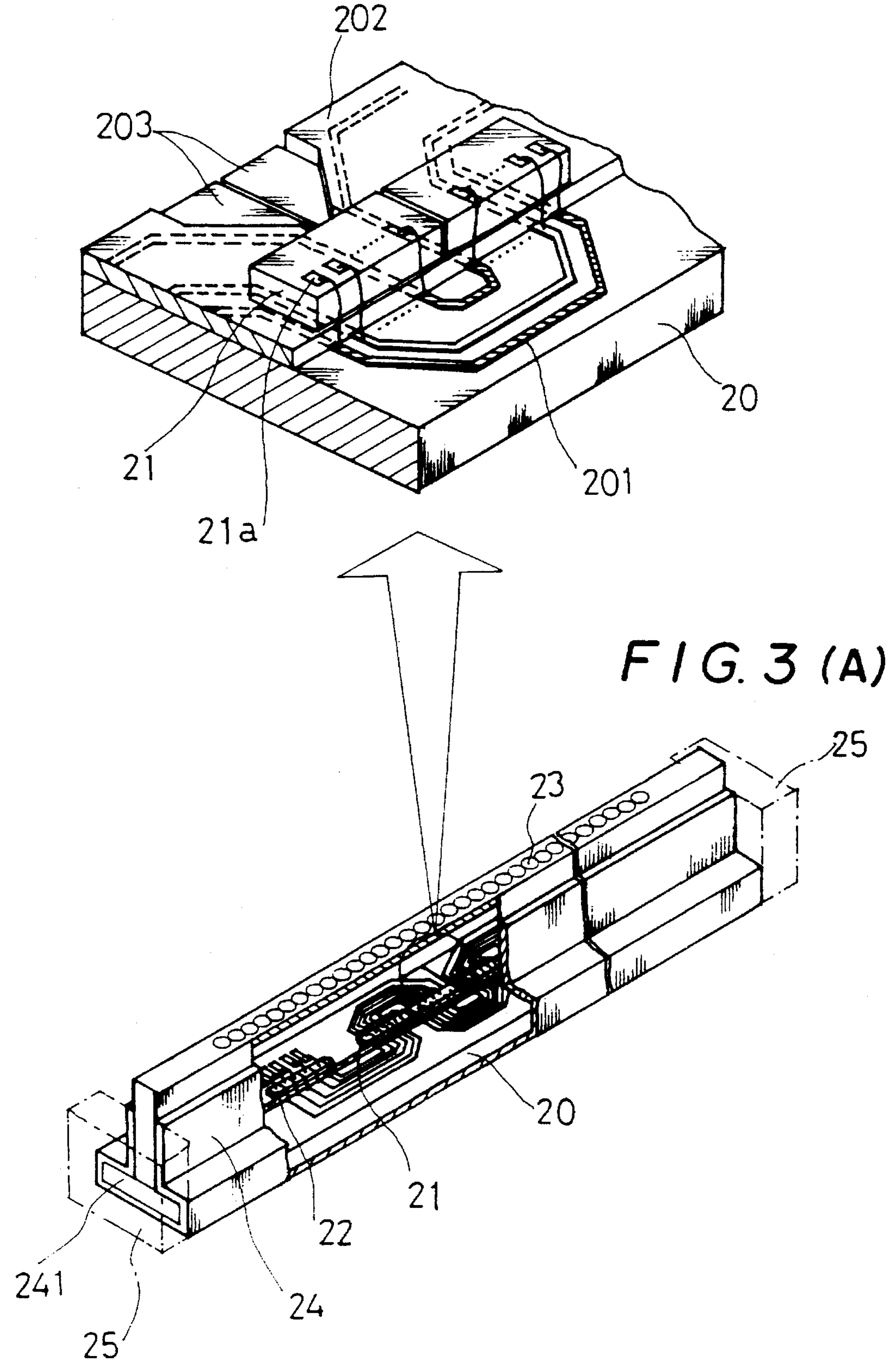

FIG. 2 is an elevation showing a layout constitution of the exposure unit 2. The exposure unit 2 included a print circuit board 20 equipped with an array of LED tips 21 paralleled along a center axis of drum, drive IC's 22 (see FIG. 3(A)), and so forth, a convergence lens 23 array of which lens is available under the trademark of Selfoc lens disposed upon the LED tips 21 array, a head block 24 integrating firmly the print circuit board 20 and the lens array 23, and a pair of side blocks enclosing longitudinal ends of the head block 24, having a projection of fixing axis 26 corresponded with the center of drum 1.

As shown in FIG. 3(A), the head block 24 was formed of opaque dielectric material having a longitudinal slot 241 in a topsy-turvy letter T. The level bottom of the slot 241 held the print circuit board 20. The vertical slit of the slot 241 held firmly the lens array 23 formed above the LED tips 21, of which vertical center was corresponded with the incident line of an LED element 21*a*.

A connector 28 was provided at the bottom of head block 24. Signals corresponding to the image information were sent to drive the drive IC's 22 on the print circuit board 20 through lead wires 29 connected at the connector 28.

The print circuit board 20 was formed, as shown in FIG. 3(B), of dielectric or ceramic board of which surface was printed pattern circuits 201 in a matrix to be connected to each of LED elements 21*a*, and common circuits 203 thereunder interposing a dielectric layer 202 therein. Terminals of the LED tips 21 and the drive IC's 22 were electrically connected with the circuits 201, 203 by electric connection means such as bonding, or the like. The array of LED elements 21*a* was formed above the LED tips 21 in a line longitudinally along thereof. The lens array 23 was disposed along the center line of the LED elements 21*a*.

Figure 4:
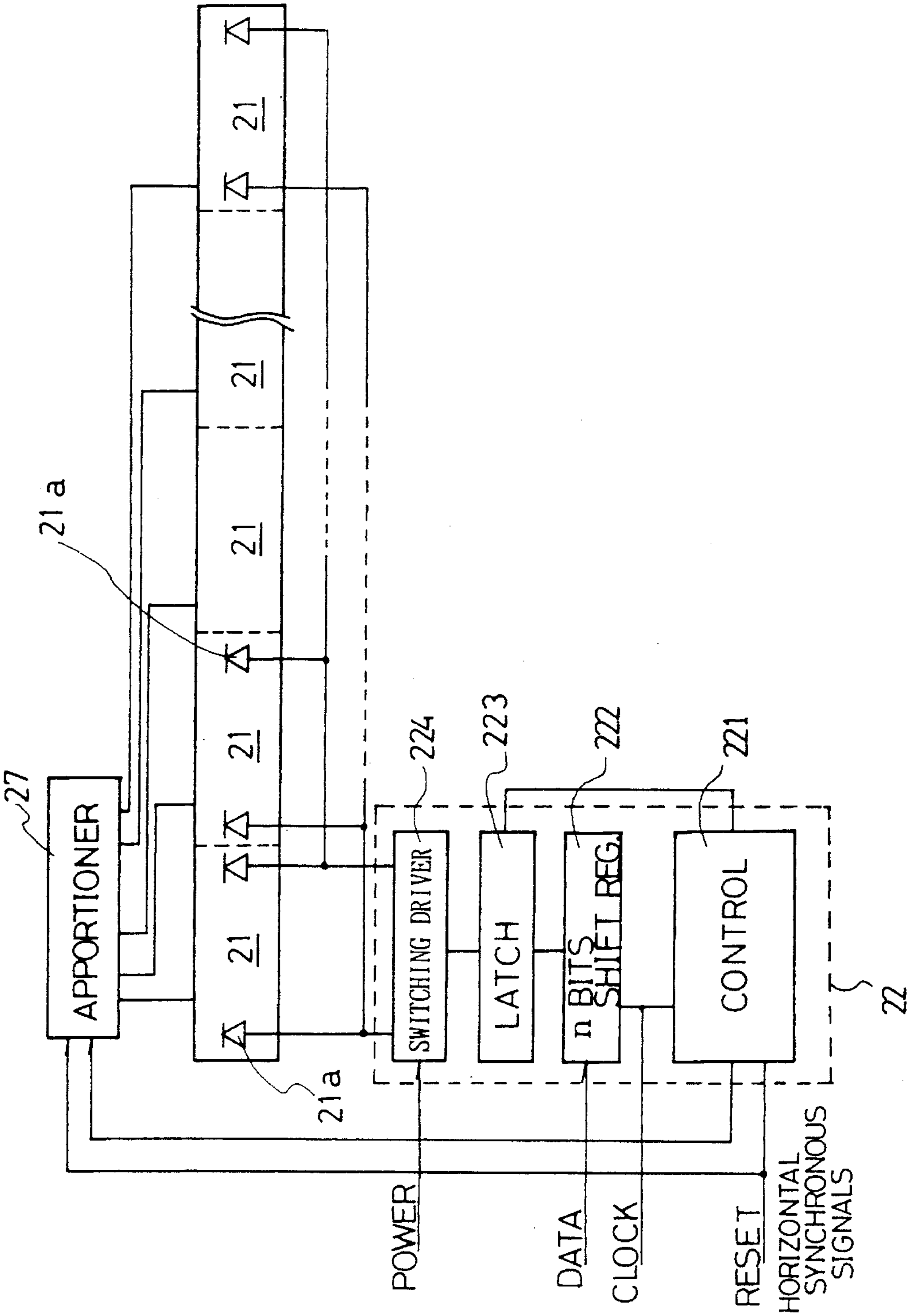

FIG. 4 is a circuit block diagram showing the LED head of dynamic drive system disposed on the print circuit board. A plurality of LED tips 21 included n bits of LED elements 21*a* was formed in a line array. The drive IC's 22 were formed in a drive unit which included: a control unit 221, an n bits shift register 222 having a memory capacity corresponded to the n bits LED elements 21*a* of the tips 21, a latch unit 223, and a switching driver unit 224 having switch elements corresponded to the number n of the LED elements 21*a* which were connected to the switch elements by the pattern circuits 201.

An apportion unit 27 was a unit to shift sequentially the connection between the switching driver unit 224 and LED tips 21 upon lighting up previous LED tip 21.

Following is a summing-up on the LED head operation known in the art.

Upon receiving a clock signal, the first n bits image information is taken serially and loaded in the shift register 222, which transfers the information in parallel to the latch unit 223 to following a latch signal from the control unit 221. Then, the switching driver unit 224 turn on the power to light the LED elements 21*a* of first LED tip 21 corresponding to the latch data or image information. Succeeding to the transfer of the first information to the latch unit 223, the second n bits information is loaded in the shift register 222. The second latch signal stimulates the latch unit 223 to transfer the second information to the switching driver unit 224, and the apportion unit 27 to shift the connection to the next second LED tip 21, too. Then, the switching driver unit 224 light the LED elements 21*a* of the second LED tip 21 according to the second information. The drive unit 22 repeats the steps m times until lighting the last LED tip 21 for the full horizontal scanning line. The steps will be repeated subsequently for the vertical subscanning lines for a sheet of recording paper.

It was sufficient, therefore, to form the exposure unit 2 in the dynamic drive system assembling with one array of the LED tips 21, and one set of the drive unit 22 and the apportion unit 27. Thus, the print circuit board 20, as shown in FIG. 3(A), was able to form in a narrow belt disposed longitudinally the array of LED tips 21 with the units at each one end thereof. The LED head, as shown in FIG. 5(A), resulted in having a sectional area of height 20 mm, and width 14 mm which allowed to be inserted in the cylindrical photoreceptor drum 1 having a diameter of 30 mm.

Figure 5B:
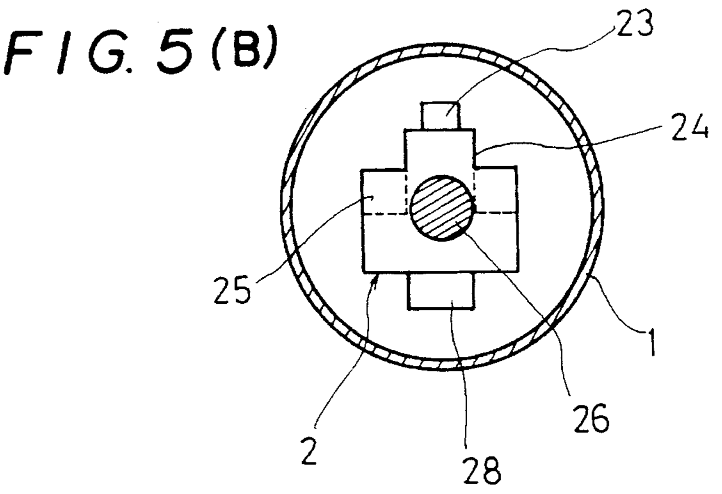
FIG. 5(B) is a sectional view along A—A line of the FIG. 5(A) showing a drum unit assembled with the photoreceptive member and the exposure unit relating to an embodiment of the present invention.
Figure 5A:
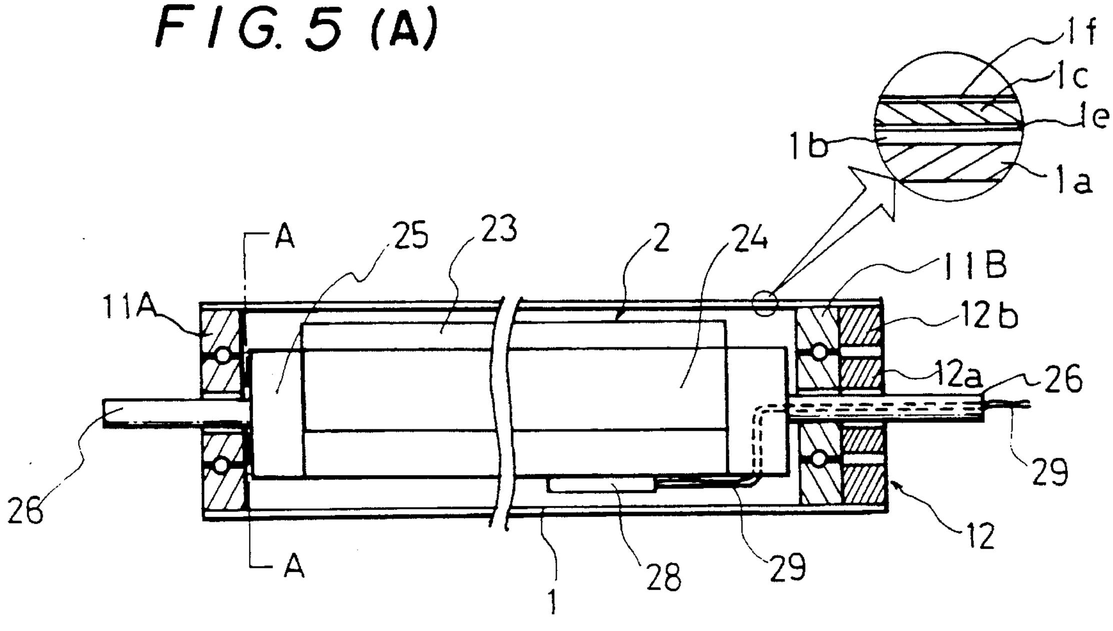
FIG. 5(A) is a schematic sectional elevation.

Constitution of a drum unit, as shown in FIG. 5, assembled with the photoreceptive member 1 formed in a drum and the exposure unit 2 will be described.

The exposure unit 2, as described earlier, was inserted in the photoreceptor drum 1. At each of ends of fixing axes 26, bearings 11A, 11B having an outer diameter as same to an inner diameter of drum 1 were disposed in the drum 1 to set coaxially the exposure unit 2 through the bearings 11A, 11B therewith.

Among the bearings 11A, 11B, the bearing 11B was disposed further inward the drum 1 to provide a certain end space in which an outer-rotor type electromagnetic motor 12 was firmly assembled within the drum 1.

The outer-rotor type electromagnetic motor 12 was formed with a stator 12*a* of which outside was disposed rotatably with a rotor 12*b* having an outer diameter as same to the inner diameter of drum 1. The stator 12*a* held firmly the fixing axis 26 of side block 25 within a bearing hole thereof. The rotor 12*b* assembled within the drum 1 was assured firmly with screws, or the like.

In the constitution in the embodiment above, the outer-rotor type electromagnetic motor 12 has driven the photoreceptor drum 1 alone keeping the exposure unit 2 held with the fixing axes 26 orientating the incident light in place.

The drum 1, unlike the drive system above, may be driven directly with gears engraved outer surface thereof by a pinion, if required.

Figure 6:
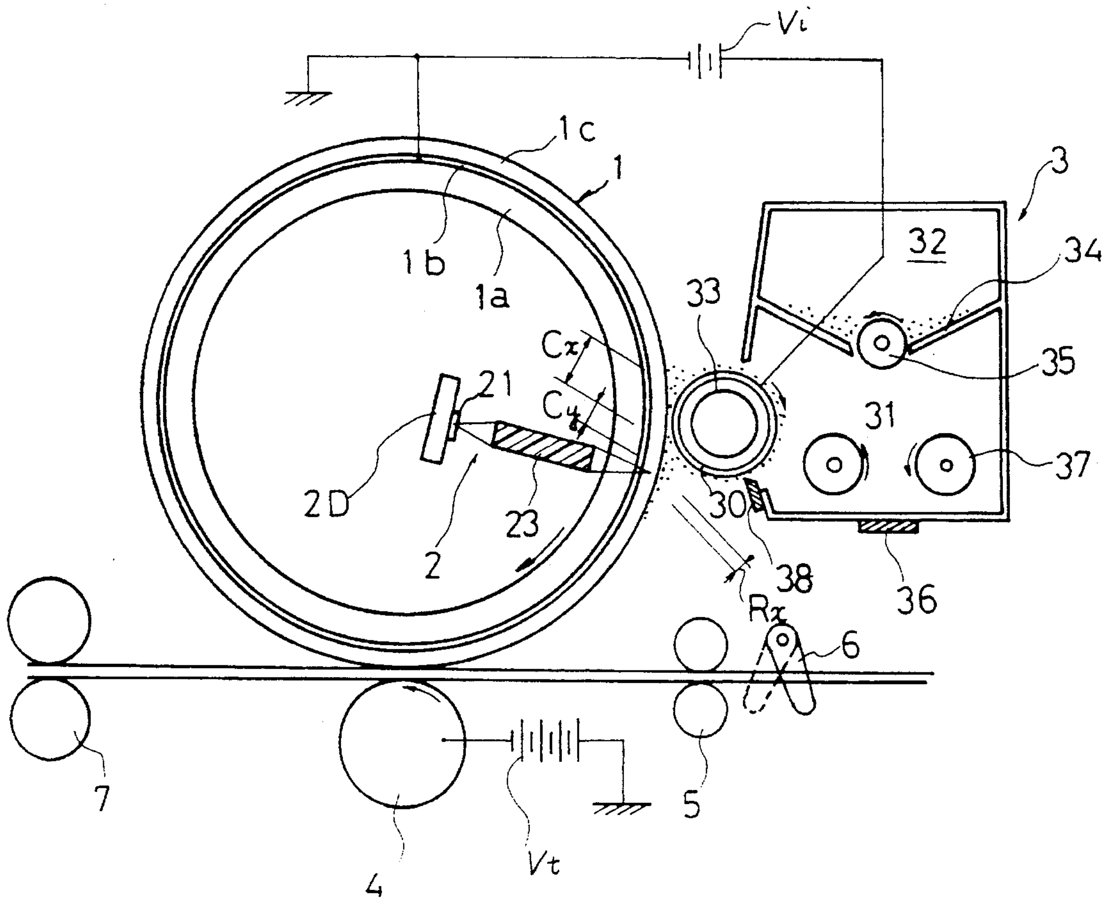
FIG. 6(A) is a schematic sectional elevation showing an image forming apparatus adopting the drum unit.
FIG. 6(B) is an enlarged detail of the FIG. 6(A).
Figure 6:
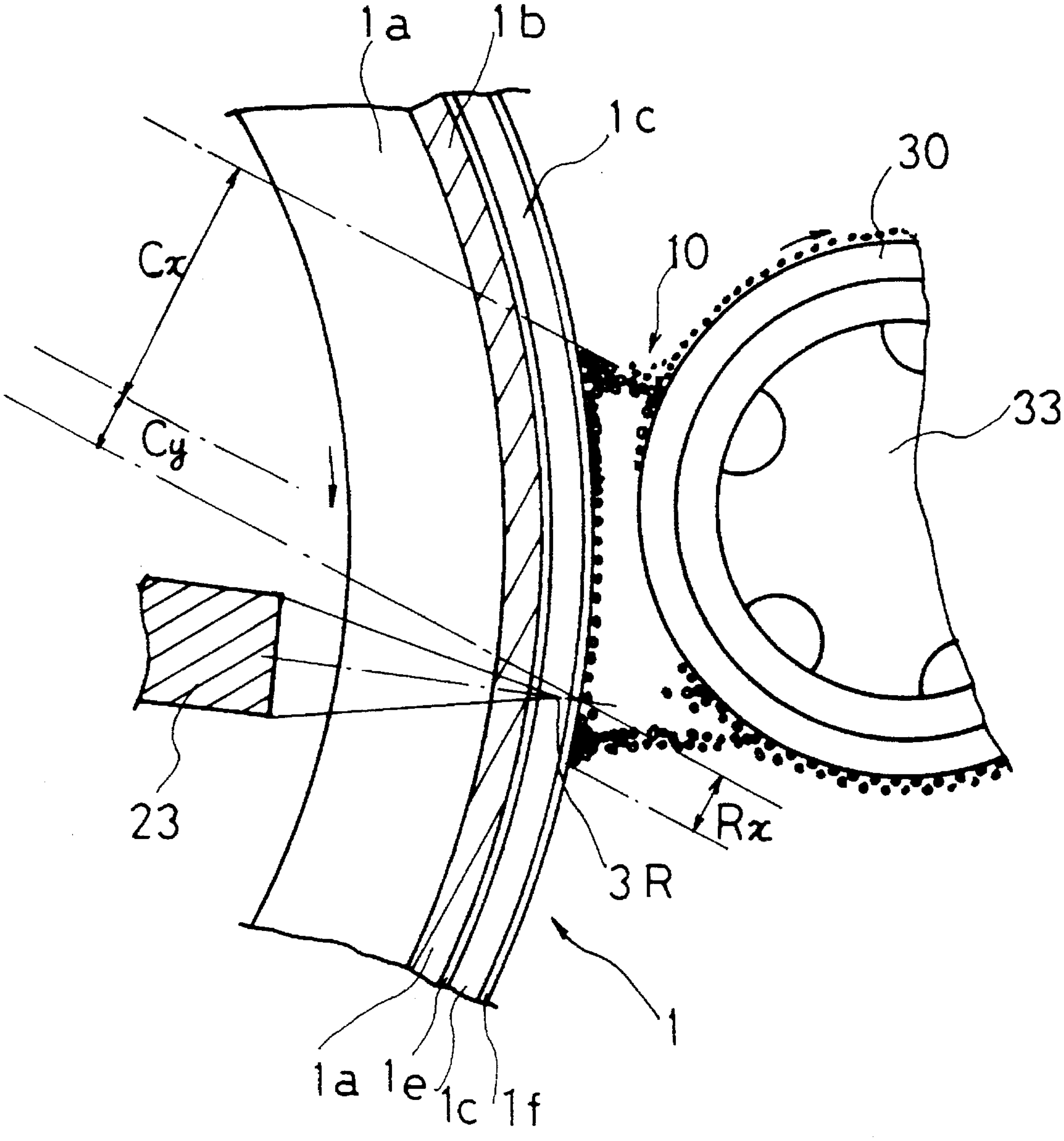

FIG. 6(A) is a schematic sectional elevation, showing the image forming apparatus adopting the drum unit, and FIG. 6(B) is an enlarged detail of the FIG. 6(A). The image forming apparatus was formed to face a developing unit 3 outward the photoreceptor drum 1 interfaced with the focus point 3R of the exposure unit 2 therein.

The developing unit 3 was formed with a toner container 32, and a container member 31 containing toner and carrier. The developing unit 3 further included with a developing sleeve 30 disposed rotatably at the outlet of the container member 31 facing to the photoreceptor drum 1. The developing sleeve 30 contained a stationary magnet assembly 33 therein. The developing sleeve 30 was also formed rotatably clockwise in the same direction of the rotation of the photoreceptor drum 1, that is, in a counter feeding manner.

The inside of the container member 31 was divided with a partition wall 34 to form the toner container 32. The partition wall 34 had a slit opening which was provided with a rotatable feed roller 35. A sensor 36 for detecting composition ratio of the toner with the carrier was formed to send a signal to rotate the feed roller 35 and to feed the toner at every occasion when the ratio fell to a certain value. Thus, the toner composition ratio was kept in a desired range.

A pair of mixers 37 formed of magnetic roll was rotatably disposed at the bottom of the container member 31. The mixture of toner and carrier or developer in the container member 31 was stirred to keep the even composition thereof.

A doctor blade 38 was disposed at the lower end of outlet of the container member 31 to form controllably a thin layer of developer on the developing sleeve 30, which fed the developer layer to the developing site.

Following is a description on the composition of the developer, the mixture of the toner and carrier, adopted to the developing unit 3.

Figure 7:
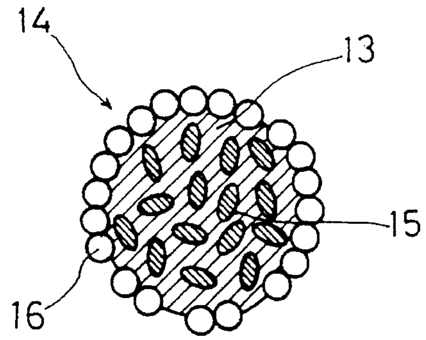
FIG. 7 is a schematic sectional elevation showing carrier for developer relating to an embodiment of the present invention.
Figure 8:
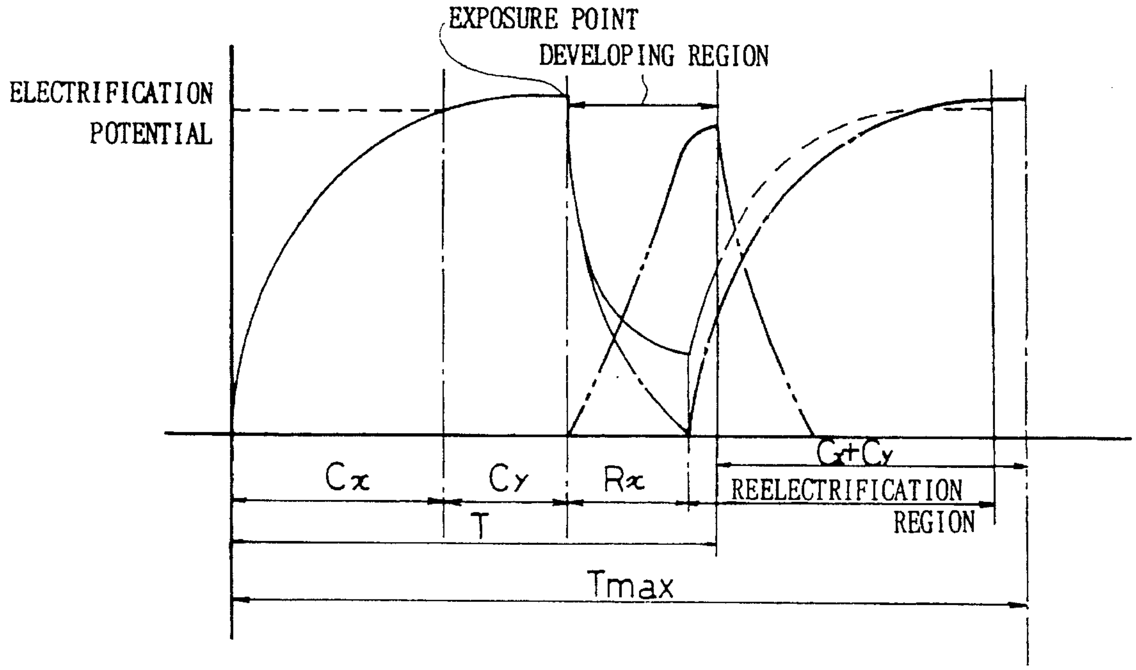
FIG. 8 is a graph showing a relation of an electrification time C and an exposure time R in a developer brushing contact region relating to an embodiment of the present invention.

FIG. 7 is a schematic sectional elevation showing the carrier for the developer. The carrier 14 was formed with a carrier basic particle 13 with magnetic powder 15 dispersed evenly therein, and with electric conductive fine particles 16 attached firmly on the surface of the carrier basic particle 13.

The volume resistivity of the carrier 14 was preferred to be less than $10^8\Omega\cdot$cm, or more preferably, to be less than $10^4\Omega\cdot$cm. The higher resistivities were apt to damage the characteristics as for an electric conductive carrier. An application of the developer with higher resistivity in the rear side exposure system, for example, rendered the photoreceptive member in a poor electrification because of slow injection speed thereof. The electric conductivity of the carrier 14 was mainly represented with that of the electric conductive fine particles 16.

The resistivity of carrier 14 was measured with a tetrafluoro resin cylinder having a diameter 20 mm with a pair of plate electrodes having a diameter 20 mm at both ends thereof. The carrier weighing 1.5 g was enclosed in the cylinder pressing the electrode with a load of 1 kg.

The magnetic force of carrier 14 was required for some extent, preferably a maximum magnetization 55 emu/g or more at a magnetic field 5 kOe, more preferably, in a range from 55 to 80 emu/g. The maximum magnetization at a magnetic field 1 kOe was also required to be 45 emu/g, or more preferably, in a range from 45 to 60 emu/g. The less the magnetic force of the carrier 14, the less the carrying capability became the developer to be developed together with the toner.

The average grain size of the carrier was preferred to be in a range from 10 to 100 μm, or more preferably, in arrange from 15 to 50 μm. The larger in size the carrier 14, the harder the electrification evenly became the photoreceptive member, and the harder the inclusion of toner became the composition of developer. On the contrary, the smaller in size the carrier 14, the less the carrying capability became the developer, and the harder the electrification in a certain level became the photoreceptive member.

The net density of the carrier 14 was preferred to be in a range from 3.0 to 4.5 g/$cm^3$.

Magnetite $Fe_3O_4$, ferrite $Fe_2O_3$, or the like, were adopted as the magnetic powder 15 in which the magnetite was more preferred, but was not restricted thereto.

Carbon black, tin oxide, electric conductive titanium oxide that was titanium oxide coated with conductive material, silicon carbide, or the like, were adopted as the electric conductive fine particles 16, that was preferred any of materials not to be affected to lose the conductivity by oxidation with oxygen in the air.

Binding resins adopted for the carrier basic particle 13 were vinyl resins represented by polystyrene resins, polyester resins, polyamide resins available under a trademark of Nylon, polyolefin resins, and so forth.

To attach the electric conductive fine particles 16 on the surface of carrier basic particle 13 was subjected the particles to following steps: mixing evenly the basic particle 13 and the fine particles 16, adhering the fine particles 16 on the surface of basic particle 13, and then forcing the fine particles 16 with a mechanical or thermal impact so that the fine particles 16 sunk firmly onto the basic particle 13. The fine particles 16 were not sunk completely in the basic particle 13, but were disposed firmly so that the part of fine particles 16 was projected above the surface of the basic particle 13.

Thus, it was possible to provide effectively the carrier 14 with a higher electric conductivity by disposing the electric conductive fine particles 16 on the surface of carrier 14. Because it was not necessary to include the electric conductive fine particles 16 in the carrier basic particle 13, it was possible to dispense more magnetic powder 15 filling the saved space in the basic particle 13 to enhance the magnetic force of the carrier 14.

The developer was formed by mixing the carrier and toner.

The traditional resistive toner was adopted having a preferable volume resistivity more than $10^{14}\Omega\cdot cm$, or more preferably, $10^{16}\Omega\cdot cm$, or more. The resistivity was measured by the same method as for the carrier described earlier.

The composition of toner was as the same known in the art, for example, that any of binder resins, coloring materials, charge inhibitors, off-set inhibitors, or the like, were composed in the toner. Further, the toner was also able to be improved for magnetic toner by adding magnetic powder. The magnetic toner was effective to be free from scattering of toner in the apparatus.

Referring FIG. 6(B), the alignment of the exposure unit 2 with respect to the developing sleeve 30, those of which interfaced the photoreceptor drum 1, will be described as follow.

The exposure unit 2, as described earlier, was aligned so that the focus point 3R of the lens array 23 was located at the photoconductive layer 1*c* of the drum 1, and deviating the focus point 3R at the slightly downstream along the rotation of drum 1 with respect to the center line connecting the centers of drum 1 and developing sleeve 30.

Thus, in the developer brushing contact region 10, distances in which the photoconductive layer 1*c* passed the region 10 were possible to define to be in a following relation expressed FORMULA (3), taking grants: Cx as a distance from the starting point of the region 10 to be electrified until the charge reached to a certain level, Cy as a succeeding distance for stabilization of the charge to the exposure point, and Rx as a distance from the exposure point to the terminal end of the region 10, $$Cx+Cy>Rx \qquad \text{FORMULA (4)}$$

because the FORMULA (4) was possible to introduced by the following relations;

$$C=(Cx+Cy)/A, \qquad \text{Formula (2)}$$

$$R=Rx/A, \text{ and}$$

$$C>R,$$

where A was a circumferential speed of the photoreceptor drum 1.

In FIG. 6(A), notations of 4 is a transfer roller, 5 is a pair of register rollers, 6 is a paper feed sensor, and 7 is a pair of heat fusing rollers, respectively.

The transfer roller 4 was formed with an electric conductive roller to obtain effective transference. The transfer roller 4 was applied a transfer bias with reverse polarity of the toner charge. The transfer roller 4 is also formed rotatably in synchronizing to the photoreceptor drum 1, in pressing the peripheral surface thereof.

Following is a description on an operation of forming image.

The developing sleeve 30 was formed in a diameter 30 mm rotatably clockwise with a rotation speed 250 rpm with an application of developing bias of direct voltage Vi: +50 V.

The photoreceptor drum 1 was formed rotatably in also clockwise with a rotation speed 25 rpm. A gap distance between the drum 1 and the developing sleeve 30 was set as 0.3 mm. Alignment for orientation and intensity of the stationary magnet assembly 33 inserted in the sleeve 30 was adjusted so that a height of the developer brush became to be in a range from 0.4 to 0.5 mm.

The exposure unit 2 was adjusted by a source power current in which exposure energy irradiated at the photoreceptor drum 1 was set more than 0.5 $\mu J/cm^2$ with an exposure time for the time sharing drive in a range from 10 to 50 $\mu s$.

The transfer roller 4 was set to be biased Vt: −300 V.

As provided with the condition above, the apparatus was operated sequentially to form an image on recording paper following the steps: turning on power source to check for initialization bringing the apparatus ready for operation, firstly turning on the electromagnetic motor 12, then turning on a motor (not illustrated) for the developing unit 3 to rotate the mixers 37 and developing sleeve 30 as well, and simultaneously checking the toner composition by the sensor 36. After a pose to form the developer brushing contact region 10 at the gap space between the drum 1 and the sleeve 30 by rotation thereof, the register rollers 5 fed recording paper which was followed by exposure of the exposure unit 2 to form an image on paper according to the action of the present invention described previously.

As shown in FIG. 6(B), the developer brushing contact region 10 was formed with a distance about 5 mm each at the both sides of center line where the drum 1 and the sleeve 30 were close each other with the minimum distance to form in a counter feed manner.

The application of bias Vi at the state of formation of the region 10 had charged the photoconductive layer 1*c* of the drum 1 through the carrier 14 up to a saturation potential +45 V, or so.

Upon reaching the saturation potential, the layer 1*c* was exposed which soon took place development of image on the surface of drum 1 to show an image density (ID) about 1.4 when the drum 1 left the region 10. Thus, the image was formed without reducing the ID number due to electrification again by the brushing contact action of carrier 14, without fog, and without image distortion due to the mechanical brushing of toner.

In the embodiment of the present invention, measurement of the parameters showed: C of 10.5 ms, R of 1.5 ms, and T of 12 ms, where C was the time from the starting of electrification to the saturation level, R was the time from the decreasing of the charge upon the exposure to fall to the latent image level, T was the time during which the drum 1 passed through the region 10. The values measured were, thus, confirmed to satisfy the FORMULAE (1) through (3). The values of R, C and T were defined, as described previously, by a combinational set-up such as the diameters and rotation speed of the drum 1 and sleeve 30, the distance of gap space, the height of developer in the region, and so forth.

In the embodiment of this invention, the dielectric toner was preferred, because the toner was capable to prevent from reelectrification, and then, the toner attached at the latent image portion was not possible to be removed electrically except by mechanical brushing, which allowed the toner held harmlessly at the latent image portion until reaching to the transference site.

The apparatus was subject to print 10,000 sheets of paper, and was found that the ID more than 1.4 was kept unchanged without fog which assured the function thereof.

An attempt was subjected to make the apparatus possible to adopt electric conductive toner. In place of the two-component developer, developer with the conductive toner of which volume resistivity in a range from $10^4$ to $10^6\Omega$·cm had been tried. The surface of photoconductive layer was observed to see the change of potential with respect to the change of the exposure pulse intensity per unit area, which was found as follow:

POTENTIAL AT SURFACE OF PHOTOCONDUCTIVE LAYER [V]

| EXPOSURE PULSE TIME | EXPOSURE PULSE INTENSITY [μJ/cm ³] | | |
|---|---|---|---|
| [μs} | 0.5 | 1 | 2 |
| 40 | 12 | 18 | 20 |
| 50 | — | 18 | — |
| 100 | — | 10 | — |
| 200 | 2 | 4 | 7 |

the result showed that, even though the exposure pulse intensity was made strengthened, the potential at the surface of the photoconductive layer fell rapidly at the exposure pulse time 200 μs or more.

This was interpretable that the layer was reelectrified on the exposure process in the developer brushing contact region. In the case specially to adopt the conductive toner, therefore, it was preferred to set the exposure time for the time sharing drive in a range from 40 to 200 μs.

What is claimed is:

1. In an image forming apparatus having an endless photoreceptive member, the endless photoreceptive member being composed of a transparent support member laminated with a transparent electroconductive layer and a photoconductive element composed of at least one layer of photoconductive material, the transparent electroconductive layer being interposed between the transparent support member and the photoconductive element, the image forming apparatus further having exposure means disposed within the endless photoreceptive member and positioned at the side of said transparent electroconductive layer for irradiating said photoreceptive member with light, and a toner support member for carrying developer and forming a brush of the developer, said toner support member disposed opposing the photoreceptive member, the improvement wherein: said exposure means comprise a plurality of LED elements arrayed along a main scanning line of the photoreceptive member, said LED elements being divided into a predetermined number of blocks, said exposure means exposing the photoreceptive member in a time sharing manner block by block of the LED elements, said photoconductive element has an exposure portion located therein for receiving light exposed with said exposure means, and said photoconductive element is formed of an amorphous silicon compound; said photoreceptive member has a developer brushing contact region in contact with said brush of the developer and is electrified through said brush of the developer; the exposure portion is located in the developer brushing contact region; and the photoconductive material in said photoreceptive member has a total thickness approximately in a range from 2 to 17 μm.

2. An image forming apparatus as claimed in claim 1, wherein the photoconductive layer is formed of a plurality of layer regions including a photoinductive layer region at the side of the transparent electroconductive layer, and a carrier transfer layer region provided at the side of the surface layer for transferring carrier generated with the photoinductive layer region to the surface layer.

3. In an image forming apparatus having an endless photoreceptive member laminated with a transparent electroconductive layer and a photoconductive layer on a transparent support member, exposure means disposed within the endless photoreceptive member and positioned at the side of said transparent electroconductive layer for irradiating said photoreceptive member with light, and a toner support member for carrying developer and forming a brush of the developer, said toner support member disposed opposing the photoreceptive member, the improvement wherein: said exposure means having a plurality of LED elements arrayed along a main scanning line of the photoreceptive member, said LED elements being divided into a predetermined number of blocks, said exposure means exposing the photoreceptive member in a time sharing manner block by block of the LED elements; said photoconductive layer has an exposure portion located therein for receiving light exposed with said exposure means, and said photoconductive layer is formed of an amorphous silicon compound; said photoreceptive member has a developer brushing contact region in contact with said brush of the developer and is electrified through said brush of the developer; the exposure portion is located in the developer brushing contact region; and the exposure portion is located downstream, in the direction of movement of the photoreceptive member, from the middle of the developer brushing contact region.

4. An image forming apparatus as claimed in claim 3, wherein the developer includes a carrier having a surface formed by an electric conductive treatment, and high electric resistivity or dielectric toner.

5. An image forming apparatus as claimed in claim 4, wherein the average size of the carrier is approximately in a range from 1 to 5 times of that of the toner.

6. An image forming apparatus as claimed in claim 4, wherein the carrier is so formed that a basic particle made any of dielectric resins having magnetic powder dispersed therein, and that electric conductive fine particles are attached on the surface of the basic particle, and wherein the carrier is electric conductive and heat fusible having the color almost the same as toner.

7. In an image forming apparatus having an endless photoreceptive member laminated with a transparent electroconductive layer and a photoconductive layer on a transparent support member, exposure means disposed within the endless photoreceptive member and positioned at the side of said transparent electroconductive layer for irradiating said photoreceptive member with light, and a toner support member for carrying developer and forming a brush of the developer, said toner support member disposed opposing the photoreceptive member, the improvement wherein: said exposure means comprise a plurality of LED elements arrayed along a main scanning line of the photoreceptive member, said LED elements being divided into a predetermined number of blocks, said exposure means exposing the photoreceptive member in a time sharing manner block by block of the LED elements; said photoconductive layer has an exposure portion located therein for receiving light exposed with said exposure means, and said photoconductive layer is formed of an amorphous silicon compound; said photoreceptive member has a developer brushing contact region in contact with said brush of the developer and is electrified through said brush of the developer; the exposure portion is located in the developer brushing contact region; and said photoreceptive member is formed in a cylindrical photoreceptor drum having a diameter smaller than 50 mm.

8. An image forming apparatus as claimed in claims 1 or 7, wherein the moving direction of the photoreceptive member in the developer brushing contact region is set to be opposite to the toner carrying direction of the toner support member.

9. A rear side exposure type electrophotographic image forming apparatus comprising: an endless photoreceptive member including a transparent support member, a transparent electroconductive layer provided on said support member and a photoconductive layer provided on said electroconductive layer, said photoconductive layer being formed of an amorphous silicon compound; exposure means disposed within the endless photoreceptive member and positioned at the transparent support member side of the photoreceptive member for irradiating the photoconductive layer thereby forming a latent image in the photoconductive layer, the exposure means having a plurality of LED elements arrayed along a main scanning line of the photoreceptive member, the LED elements being divided into a predetermined number of blocks along the main scanning line; driving means for driving the array of the LED elements for light irradiation block by block in a time sharing manner; toner support means disposed opposing the photoreceptive member; and developer carried by said toner support means and forming a brush wherein the developer includes a carrier, said carrier having dielectric basic particles, magnetic powder dispersed in each basic particle and electric conductive particles attached on the surface of each basic particle.

10. An electrophotographic image forming apparatus as claimed in claim 9 wherein the carrier has an average size approximately 1 to 5 times larger than that of a toner particle used in the developer.

11. An electrophotographic image forming apparatus as claimed in claim 9 wherein the dielectric basic particle is formed by a heat fusible material having substantially the same color as that of a toner used in the developer.

12. An electrophotographic image forming apparatus as claimed in claim 9 wherein the photoconductive layer is formed of an amorphous silicon compound.

13. A rear side exposure type electrophotographic image forming apparatus comprising: an endless photoreceptive member including a transparent support member, a transparent electroconductive layer provided on said support member and a photoconductive layer provided on said electroconductive layer, said photoconductive layer being formed of an amorphous silicon compound; exposure means disposed within the endless photoreceptive member and positioned at the transparent support member side of the photoreceptive member for irradiating the photoconductive layer thereby forming a latent image in the photoconductive layer, the exposure means having a plurality of LED elements arrayed along a main scanning line of the photoreceptive member, the LED elements being divided into a predetermined number of blocks along the main scanning line; driving means for driving the array of the LED elements for light irradiation block by block in a time sharing manner; and toner support means disposed opposing the photoreceptive member for carrying developer and forming a brush of the developer, wherein the photoreceptive member has a developer brushing contact region in contact with the brush of the developer and is electrified through the brush of the developer within the developer brushing contact region and wherein said exposure means irradiates the photoconductive layer with light at an exposure site located within the developer brushing contact region, and further wherein the photoreceptive member in the developer contact region moves in a direction opposite to a moving direction of the developer carried by the toner support means and wherein the exposure site is located downstream from the middle of the developer brushing contact region along movement of the photoreceptive member a predetermined distance which is sufficient to reduce electrification of the photoconductive layer after exposure.

14. A rear side exposure type electrophotographic image forming apparatus comprising: an endless photoreceptive member including a transparent support member, a transparent electroconductive layer provided on said support member and a photoconductive layer provided on said electroconductive layer, said photoconductive layer being formed of an amorphous silicon compound; exposure means disposed within the endless photoreceptive member and positioned at the transparent support member side of the photoreceptive member for irradiating the photoconductive layer thereby forming a latent image in the photoconductive layer, the exposure means having a plurality of LED elements arrayed along a main scanning line of the photoreceptive member, the LED elements being divided into a predetermined number of blocks along the main scanning line; driving means for driving the array of the LED elements for light irradiation block by block in a time sharing manner; and toner support means disposed opposing the photoreceptive member for carrying developer and forming a brush of the developer, wherein the photoreceptive member has a developer brushing contact region in contact with the brush of the developer and is electrified through the brush of the developer within the developer brushing contact region and wherein said exposure means irradiates the photoconductive layer with light at an exposure site located within the developer brushing contact region, further wherein the exposure site is located downstream along movement of the photoreceptor from the middle of the developer brushing contact region a predetermined distance so that a time for electrification before the exposure site is longer than a time for electrification after the exposure site, and wherein an electrification time C from the beginning of electrification until a charge in the photoreceptive member reaches a predetermined level, an exposure time R during which the charge reduces from the predetermined charge level to a charge level for forming the latent image, and a passing time T required for the photoreceptive member to pass through the developer brushing contact region satisfy the following formula (1) and formula (2):

$$T>C+R \qquad \text{FORMULA (1), and}$$

$$C>R \qquad \text{FORMULA (2).}$$

15. An electrophotographic image forming apparatus as claimed in claim 14, wherein the passing time T further satisfies the following formula (3):

$$T<2C+R \qquad \text{FORMULA (3).}$$

16. An image forming apparatus as claimed in claim 1 wherein said photoreceptive member is further composed of an injection blocking layer constituted by a high resistivity amorphous silicon carbide compound formed between, and contacting, the photoconductive element and the transparent electroconductive layer.

17. An image forming apparatus as claimed in claim 16 wherein said photoreceptive member is further composed of a high resistivity a-SiC surface layer formed on, and contacting, the photoconductive element, said photoconductive element being interposed between said injection blocking layer and said surface layer.

18. An image forming apparatus as claimed in claim 1, wherein, in the developer brushing contact region, an electrification time C from the beginning of electrification until a charge in the photoreceptive member reaches a predetermined level, an exposure time R during which the charge reduces from the predetermined charge level to a charge level for forming a latent image due to the exposure, and a passing time T for passing the photoreceptive member through the developer brushing contact region satisfy the following formula (1) and formula (2):

$$T>C+R \qquad \text{FORMULA (1), and}$$

$$C>R \qquad \text{FORMULA (2).}$$

19. An image forming apparatus as claimed in claim 1, wherein, in the image forming apparatus an electrically conductive toner or carrier is provided, a light input energy intensity received on the photoconductive layer exposed with the LED elements in n bits unit is set more than 0.5 $\mu J/cm^2$, and an exposure pulse time is set in a range from 5 to 200 $\mu s$.

20. An image forming apparatus as claimed in claim 18, wherein the passing time T further satisfies the following formula (3):

$$T<2C+R \qquad \text{FORMULA (3).}$$

21. A rear side exposure type electrophotographic image forming apparatus comprising: an endless photoreceptive member including a transparent support member, a transparent electroconductive layer provided on said support member and a photoconductive layer provided on said electroconductive layer, said photoconductive layer being formed of an amorphous silicon compound; exposure means disposed within the endless photoreceptive member and positioned at the transparent support member side of the photoreceptive member for irradiating the photoconductive layer thereby forming a latent image in the photoconductive layer, the exposure means having a plurality of LED elements arrayed along a main scanning line of the photoreceptive member, the LED elements being divided into a predetermined number of blocks along the main scanning line; driving means for driving the array of the LED elements for light irradiation block by block in a time sharing manner; and toner support means disposed opposing the photoreceptive member for carrying developer and forming a brush of the developer, wherein the photoreceptive member has a developer brushing contact region in contact with the brush of the developer and is electrified through the brush of the developer within the developer brushing contact region and wherein said exposure means irradiates the photoconductive layer with light at an exposure site located within the developer brushing contact region, wherein the photoreceptive member in the developer contact region moves in a direction opposite to a moving direction of the developer carried by the toner support means and wherein the exposure site is located downstream from the middle of the developer brushing contact region along movement of the photoreceptive member a predetermined distance which is sufficient to reduce electrification of the photoconductive layer after exposure.

22. A rear side exposure type electrophotographic image forming apparatus comprising: an endless photoreceptive member including a transparent support member, a transparent electroconductive layer provided on said support member and a photoconductive layer provided on said electroconductive layer, said photoconductive layer being formed of an amorphous silicon compound; exposure means disposed within the endless photoreceptive member and positioned at the transparent support member side of the photoreceptive member for irradiating the photoconductive layer thereby forming a latent image in the photoconductive layer, the exposure means having a plurality of LED elements arrayed along a main scanning line of the photoreceptive member, the LED elements being divided into a predetermined number of blocks along the main scanning line; driving means for driving the array of the LED elements for light irradiation block by block in a time sharing manner; and toner support means disposed opposing the photoreceptive member for carrying developer and forming a brush of the developer, wherein the photoreceptive member has a developer brushing contact region in contact with the brush of the developer and is electrified through the brush of the developer within the developer brushing contact region and wherein said exposure means irradiates the photoconductive layer with light at an exposure site located within the developer brushing contact region; wherein the exposure site is located downstream along movement of the photoreceptor from the middle of the developer brushing contact region a predetermined distance so that a time for electrification before the exposure site is longer than a time for electrification after the exposure site, and wherein an electrification time C from the beginning of electrification until a charge in the photoreceptive member reaches a predetermined level, an exposure time R during which the charge reduces from the predetermined charge level to a charge level for forming the latent image, and a passing time T required for the photoreceptive member to pass through the developer brushing contact region satisfy the following formula (1) and formula (2):

$$T>C+R \qquad \text{FORMULA (1), and}$$

$$C>R \qquad \text{FORMULA (2).}$$

23. An electrophotographic image forming apparatus as claimed in claim 18 wherein the developer brushing contact region has a first area before the exposure site and a second area after the exposure site, and wherein a time required for the photoreceptive member to pass through the first area substantially represents a time required for electrification of the photosensitive layer to a predetermined level and a time required for the photoreceptive member to pass through the second area substantially represents a time required for discharging the predetermined charge level to a charge level for forming the latent image.

24. An electrophotographic image forming apparatus as claimed in claim 22, wherein the passing time T further satisfies the following formula (3):

$$T<2C+R \qquad \text{FORMULA (3).}$$

* * * * *